United States Patent
Okumura

(10) Patent No.: US 8,813,375 B2
(45) Date of Patent: Aug. 26, 2014

(54) DUST-PROOF STRUCTURE OF MOVABLE COVER SUPPORTING PORTION OF CUTTING MACHINE

(75) Inventor: Michio Okumura, Anjo (JP)

(73) Assignee: Makita Corporation, Anjo-Shi (JP)

( * ) Notice: Subject to any disclaimer, the term of this patent is extended or adjusted under 35 U.S.C. 154(b) by 113 days.

(21) Appl. No.: 13/510,457

(22) PCT Filed: Nov. 8, 2010

(86) PCT No.: PCT/JP2010/069809
§ 371 (c)(1),
(2), (4) Date: May 30, 2012

(87) PCT Pub. No.: WO2011/065214
PCT Pub. Date: Jun. 3, 2011

(65) Prior Publication Data
US 2012/0240416 A1  Sep. 27, 2012

(30) Foreign Application Priority Data

Nov. 30, 2009  (JP) .............................. 2009-271534

(51) Int. Cl.
| B26B 25/00 | (2006.01) |
| B25F 5/02 | (2006.01) |
| B27B 9/00 | (2006.01) |
| B23D 47/00 | (2006.01) |

(52) U.S. Cl.
CPC . *B23D 47/00* (2013.01); *B25F 5/02* (2013.01); *B27B 9/00* (2013.01)
USPC .................................. 30/390; 30/374; 30/388

(58) Field of Classification Search
USPC .................... 30/273, 388, 390, 391, 369–377
See application file for complete search history.

(56) References Cited

U.S. PATENT DOCUMENTS

| 1,672,238 | A | * | 6/1928 | Wallace et al. ................. 30/374 |
| 4,685,214 | A | * | 8/1987 | Shearon et al. ................. 30/391 |
| 5,023,999 | A | * | 6/1991 | Looper et al. ................... 30/390 |
| 5,140,754 | A | * | 8/1992 | Martenson ...................... 30/390 |
| 7,207,115 | B2 | * | 4/2007 | Otake ............................. 30/391 |
| 2008/0066323 | A1 | * | 3/2008 | Crain et al. ..................... 30/388 |
| 2010/0162571 | A1 | * | 7/2010 | Chambers ....................... 30/124 |

FOREIGN PATENT DOCUMENTS

| JP | U-2-41901 | 3/1990 |
| JP | U-7-11302 | 2/1995 |
| JP | Y2-7-27121 | 6/1995 |

(Continued)

OTHER PUBLICATIONS

International Search Report issued in International Application No. PCT/JP2010/069809 on Jan. 11, 2011 (with translation).

*Primary Examiner* — Phong Nguyen
(74) *Attorney, Agent, or Firm* — Oliff PLC

(57) ABSTRACT

In a handheld cutting machine that is constructed such that a user holds the machine by hand and performs cutting processing while moving the same, in which a lower portion of a circular cutting blade protruded from a lower surface side of a base that is placed on a cutting object is covered by a movable cover, an enough clearance is set between a supporting annular ring of a movable cover and a rotating boss portion of a bearing box in order to smoothly open and close the movable cover while a ring spring is interposed between the supporting annular portion and an axial restricting portion to increase dust-proofness of the a movable cover support portion.

5 Claims, 10 Drawing Sheets

(56) References Cited

FOREIGN PATENT DOCUMENTS

| | | |
|---|---|---|
| JP | Y2-2501707 | 4/1996 |
| JP | A-2001-47407 | 2/2001 |
| JP | A-2003-251601 | 9/2003 |
| JP | A-2005-1896 | 1/2005 |

* cited by examiner

Front Face Side ←——→ Rear Face Side

Front Face Side ←→ Rear Face Side

Front Face Side ←——→ Rear Face Side

Front Face Side ← → Rear Face Side

Front Face Side ←——→ Rear Face Side

Front Face Side ← → Rear Face Side

Front Face Side ←→ Rear Face Side

Front Face Side ←→ Rear Face Side

Front Face Side ←→ Rear Face Side

DUST-PROOF STRUCTURE OF MOVABLE COVER SUPPORTING PORTION OF CUTTING MACHINE

TECHNICAL FIELD

The present invention relates to a dust-proof structure of a movable cover support portion of a cutting machine that is suitable for a case in which it is required to have high dust-proofness against dust generated by cutting processing or grinding processing.

BACKGROUND ART

A handheld cutting machine, which is constructed such that a user holds the machine by hand and performs cutting processing while moving the same along a cutting object, is configured such that a cutting machine main body is supported on an upper surface side of a base that is placed on the cutting object. The cutting machine main body includes a circular cutting blade that is rotated by an electric motor. The cutting blade is arranged such that a lower portion thereof is protruded from a lower surface side of the base to be cut into the cutting object. An upper portion of the cutting blade is covered by a main body case, and the lower portion protruded from the lower surface side of the base is covered by a movable cover. The movable cover is rotatably supported on the main body case, so as to be opened and closed depending on a cutting amount of the cutting blade into the cutting object, and is spring-biased to a closing direction.

This movable cover is positioned in the upper surface side of the base and is rotatably supported on an outer circumferential side of a cylindrical bearing box of the main body case. The bearing box has a bearing that rotatably supports a spindle to which the cutting blade is attached.

Cutting powder blown up from a cutting part by the cutting processing can be scattered into the main body case including surroundings of the bearing box. Conversely, in a rotatably supporting portion of the movable cover, formed between the movable cover and the bearing box is an appropriate clearance (gap) in a radial direction and an axial direction in order to secure smooth opening and closing operation of the movable cover. As a result, dust, such as the cutting powder can enter the clearance between the rotatably supporting portion of the movable cover and the bearing box. This may disturb a smooth opening and closing operation of the movable cover. Conventionally, a technique taught by, for example, a following Japanese Laid-Open Patent Application No. 2005-1896 is suggested as a dust-proof measure. In this conventional technique, a second bearing for supporting the movable cover is attached to the outer circumferential side of the bearing box apart from the bearing for supporting the spindle. The movable cover is rotatably supported via the second bearing, so that the clearance can be eliminated. In addition, a seal member of the second bearing is shielded by a seal cover, so as to perform dust-proofing.

However, in the conventional technique taught by the Patent Document described above, the second bearing is used in addition to the first bearing that rotatably supports the spindle on the main body case, so that the movable cover is rotatably supported on the bearing box. This may lead to increased costs. Therefore, it is desirable to provide a technique that is capable of reliably taking a dust-proof measure in the rotatably supporting portion of the movable cover without using such a special bearing. Thus, there is a need in the art to provide an improvised wheelchair seatbelt device.

SUMMARY OF THE INVENTION

A first aspect of the present invention provides a dust-proof structure of a rotatably supporting portion of a movable cover with respect to a main body case in a cutting machine that includes a base that is placed on an upper surface of a cutting object, a cutting machine main body that is supported on an upper surface side of the base, the cutting machine main body having the main body case and a circular cutting blade that is rotated by an electric motor, an upper portion of the cutting blade being covered by the main body case, a lower portion of the cutting blade being protruded from a lower surface side of the base, and a blade tip of a protruded portion thereof being openably and closably covered by the movable cover. The cutting blade is attached to a spindle that is rotatably supported by a bearing disposed in a bearing box of the main body case. The movable cover includes a cylindrical supporting annular portion and is rotationally supported by rotatably supporting the supporting annular portion on an outer circumferential side of the bearing box, so as to be capable of opening and closing the blade tip. The supporting annular portion of the movable cover is restricted from being displaced axially displaced by an axial restricting portion attached to the bearing box portion. An annular elastic member is interposed between an axial end surface of the supporting annular portion and the axial restricting portion while it is pressed, so that a dust entry path from a side of the cutting blade to an inner circumferential side of the supporting annular portion can be closed.

According to the first aspect of the present invention, the annular elastic member is interposed between the supporting annular portion (a movable cover support portion) of the movable cover and the axial restricting portion of the bearing box while it is pressed, so that the dust entry path from the side of the cutting blade to the inner circumferential side of the supporting annular portion can be closed. Thus, dust can be prevented from entering an inner circumferential side of the elastic member. Therefore, it is possible to secure high dust-proofness in the inner circumferential side of the supporting annular portion closed by the elastic member while an enough clearance is set between the supporting annular portion and the bearing box in order to secure a smooth opening and closing operation of the movable cover. Thus, unlike the conventional art, it is not necessary to separately use a special bearing (a second bearing) in order to eliminate the clearance between the supporting annular portion of the movable cover and the bearing box. As a result, the special bearing conventionally used can be omitted. Therefore, it is possible to secure the smooth opening and closing operation of the movable cover and the high dust-proofness in the support portion without increasing costs.

Additionally, since the elastic member is interposed between the supporting annular portion and the axial restricting portion while it is pressed, axial displacement of the supporting annular portion can be restricted. As a result, backlash of the movable cover in directions perpendicular to an opening and closing directions of the movable cover (deflection of the movable cover in right-and-left directions of the opening and closing directions) can be restricted.

A second aspect of the present invention provides the dust-proof structure, in which the elastic member is capable of being displaced in a diameter increasing direction against a biasing force in a diameter reducing direction, wherein a recessed portion for receiving at least a portion of the elastic member is provided between the supporting annular portion and the axial restricting portion, and in which at least one of the axial restricting portion, the supporting annular portion and the elastic member has an inclined surface that is inclined in a direction to displace the elastic member in the diameter increasing direction by pressing of the axial restricting portion.

According to the second aspect of the present invention, the biasing force of the elastic member can be prevented from functioning as an excessive rotational resistance (an opening and closing resistance) against the smooth opening and closing operation of the movable cover.

A third aspect of the present invention provides the dust-proof structure, in which the elastic member is made of resin.

According to the third aspect of the present invention, the elastic member can be formed by using a high-strength resin (for example, polyacetal or other such resins) having high slidability and reduced coefficient of friction and not by using metal. Therefore, friction generated by pressing the elastic member can be reduced, so that the opening and closing resistance of the movable cover can be prevented from being increased. As a result, the smooth opening and closing operation of the movable cover can be secured.

A fourth aspect of the present invention provides the dust-proof structure, in which a pressing surface of the elastic member against the inclined surface is formed as a flat surface.

According to the fourth aspect of the present invention, the elastic member can be reliably spread in the diameter increasing direction, so that sealing performance of the dust entry path can be secured. Further, sliding resistance (rotational resistance) caused by being pressed against the axial restricting portion can be reduced, so that the smooth opening and closing operation of the movable cover can be secured.

A fifth aspect of the present invention provides the dust-proof structure, in which a washer is interposed between the elastic member and the axial restricting portion to which the elastic member is pressed.

According to the fifth aspect of the present invention, when a standard retaining ring is used as the axial restricting portion, the elastic member having a larger diameter can be reliably pressed against the retaining ring via the washer that can be machined in an arbitrary size. Therefore, with regard to the elastic member that can be used, a degree of freedom in selection can be increased.

A sixth aspect of the present invention provides the dust-proof structure, in which a pressing surface of the elastic member against the axial restricting portion is formed as a flat surface so as to be pressed thereagainst in a surface contact manner.

According to the sixth aspect of the present invention, a pressing area (a sealing area) of the elastic member to the axial restricting portion can be increased, so that dust-proof performance can be further increased.

Another aspect of the present invention provides a dust-proof structure of a rotatably supporting portion of a movable cover with respect to a main body case in a cutting machine that includes a base that is placed on an upper surface of a cutting object, a cutting machine main body that is supported on an upper surface side of the base, the cutting machine main body having the main body case and a circular cutting blade that is rotated by an electric motor, an upper portion of the cutting blade being covered by the main body case, a lower portion of the cutting blade being protruded from a lower surface side of the base, and a blade tip of a protruded portion thereof being openably and closably covered by the movable cover, wherein the cutting blade is attached to a spindle that is rotatably supported by a bearing disposed in a bearing box of the main body case, wherein the movable cover includes a cylindrical supporting annular portion and is rotationally supported by rotatably supporting the supporting annular portion on an outer circumferential side of the bearing box, so as to be capable of opening and closing the blade tip, wherein the supporting annular portion of the movable cover is restricted from being displaced axially displaced by an axial restricting portion attached to the bearing box portion, and wherein the bearing box has a dust-proof wall portion that is projected toward an outer circumferential side of the supporting annular portion, so as to bent a dust entry path from a side of the cutting blade to an inner circumferential side of the supporting annular portion.

According to the dust-proof structure of another aspect, a so-called labyrinth structure is provided, that is, the dust entry path from the side of the cutting blade to the inner circumferential side of the supporting annular portion can be bent. Therefore, dust-proofness therein can be increased while a smooth opening and closing operation of the movable cover is secured.

A further aspect provides the dust-proof structure, wherein the dust-proof wall portion formed in the bearing box is determined as a first dust-proof wall portion, and the supporting annular portion is provided with a second dust-proof wall portion that is projected toward an outer circumferential side of the first dust-proof wall portion, so as to bent the dust entry path from the side of the cutting blade to the inner circumferential side of the supporting annular portion According to the dust-proof structure of the further aspect, a labyrinth structure having higher dust-proof performance can be provided.

A further aspect provides the dust-proof structure, wherein an annular elastic member is interposed between the second dust-proof wall portion and the bearing box while it is pressed.

According to the dust-proof structure of the further aspect, dust-proof performance can be further increased by both of the labyrinth structure and the elastic member.

A further aspect of the present invention provides a dust-proof structure of a rotatably supporting portion of a movable cover with respect to a main body case in a cutting machine that includes a base that is placed on an upper surface of a cutting object, a cutting machine main body that is supported on an upper surface side of the base, the cutting machine main body having the main body case and a circular cutting blade that is rotated by an electric motor, an upper portion of the cutting blade being covered by the main body case, a lower portion of the cutting blade being protruded from a lower surface side of the base, and a blade tip of a protruded portion thereof being openably and closably covered by the movable cover, wherein the cutting blade is attached to a spindle that is rotatably supported by a bearing disposed in a bearing box of the main body case, wherein the movable cover includes a cylindrical supporting annular portion and is rotationally supported by rotatably supporting the supporting annular portion on an outer circumferential side of the bearing box, so as to be capable of opening and closing the blade tip, wherein the supporting annular portion of the movable cover is restricted from being displaced axially displaced by an axial restricting portion attached to the bearing box portion, and wherein a dust-proof washer is attached to the spindle, and a circumferential peripheral edge portion of the dust-proof washer enters a recessed portion formed in the supporting annular portion, so as to bent a dust entry path from a side of the cutting blade to an inner circumferential side of the supporting annular portion.

According to the dust-proof structure of the further aspect, since a labyrinth structure capable of bending the dust entry path is provided between the circumferential peripheral edge portion of the dust-proof washer and the supporting annular portion, dust-proofness therein can be increased while a smooth opening and closing operation of the movable cover is secured.

A still further aspect provides the dust-proof structure, wherein fins are provided to the dust-proof washer, so that the dust-proof washer can function as a dust-proof fan capable of blowing away dust when the spindle is rotated.

According to the dust-proof structure of the still further aspect, since the dust-proof washer that rotates integrally with the spindle can function as the dust-proof fan that us capable of blowing away the generated dust, the dust-proofness of the supporting annular portion can be further increased in combination with the labyrinth structure.

MODE FOR CARRYING OUT THE INVENTION

Figure 1:
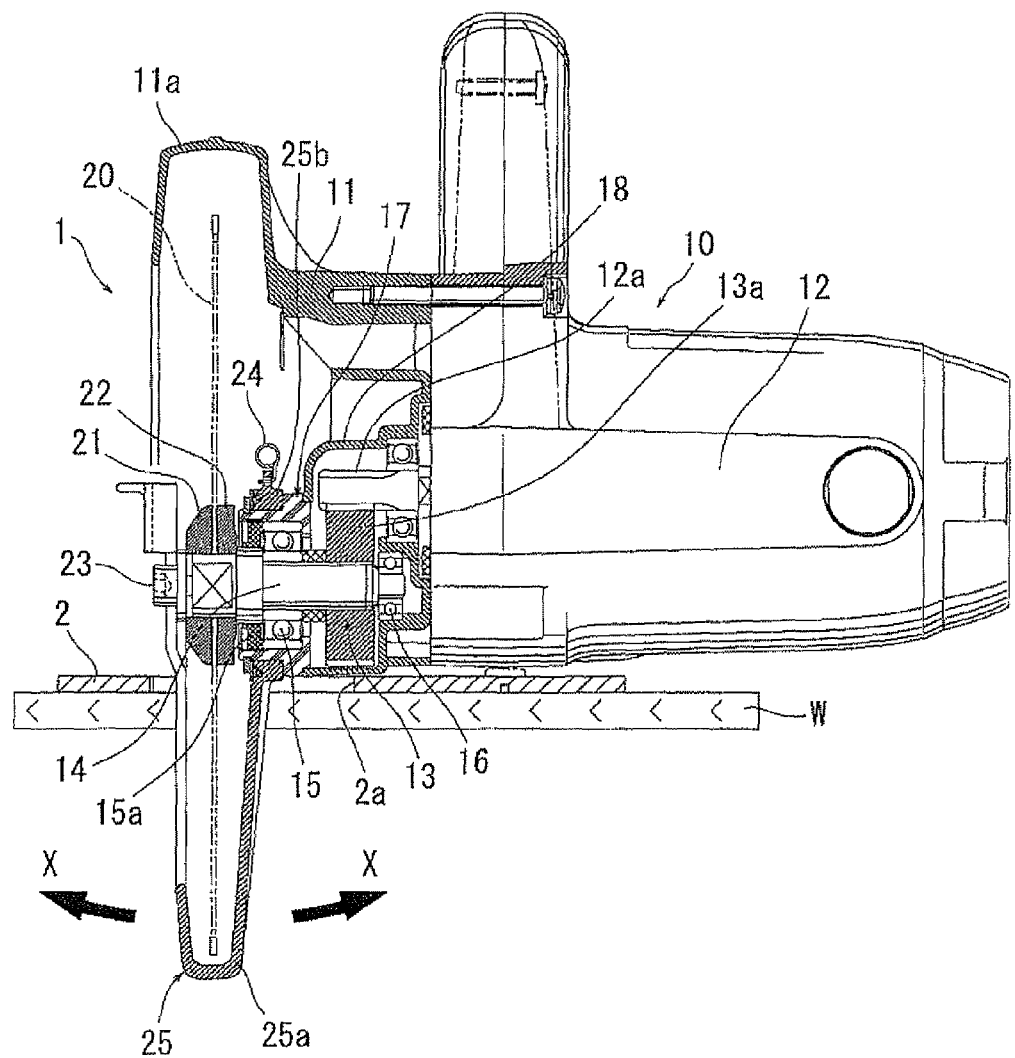
FIG. 1 is an overall side view of a cutting machine having a dust-proof structure according to a first embodiment of the present invention. This drawing shows a view of the cutting machine that is viewed from a front side in a cutting progressing direction. Further, in this drawing, each of a main body case and a movable cover is shown in vertical cross section. Further, the movable cover is shown in a condition in which it is fully closed.

Next, embodiments of the present invention and its related invention will be described with reference to FIGS. 1 to 10. FIG. 1 shows a cutting machine 1 which is referred to as a handheld circular saw. The cutting machine 1 includes a base 2 that is placed on an upper surface of a cutting object W, and a cutting machine main body 10 that is supported on an upper surface side of the base 2. The cutting machine main body 10 includes an electric motor 12 as a drive source, which motor is positioned in a rear face of the main body case 11. A rotational output of the electric motor 12 is transmitted to a spindle 14 via a reduction gear train 13. The reduction gear train 13 is composed of a pinion gear 12a of the electric motor 12 and a drive gear 13a meshing with each other and is received within a gear box 18. The drive gear 13a is secured to the spindle 14. The spindle 14 is rotatably supported on the main body case 11 via bearings 15 and 16. The front face-side bearing 15 is held on an inner circumferential side of a bearing box 17. Similarly, a seal member 15a for dust-proofing is attached to a front side of the bearing 15 while it is positioned in the inner circumferential side of the bearing box 15. The rear face-side bearing 16 is held on the gear box 18. The bearing box 17 is attached to a front face side of the gear box 18.

A distal end side of the spindle 14 protrudes from the bearing box 17 and reaches an interior portion of the main body case 11. A circular cutting blade 20 is attached to a distal end portion of the spindle 14. The cutting blade 20 is attached to the spindle 14 while being held between an outer side fixture flange 21 and an inner side fixture flange 22 in a thickness direction, so as to not move in an axial direction and a rotational direction. A holding condition of the fixture flanges 21 and 22 is secured by a fixing screw 23 threaded into a distal end of the spindle 14.

A circumferential peripheral portion (a blade tip) corresponding to a substantially upper half circumference of the cutting blade 20 is covered by a cover portion 11a of the main body case 11. A substantially lower half circumference of the cutting blade 20 is protruded from a lower surface side of the base 2 via a window portion 2a formed in the base 2. A protruded portion of the cutting blade 20 that is protruded from the lower surface side of the base 2 can be cut into the cutting object W.

The circumferential peripheral portion (the blade tip) of the cutting blade 20 corresponding to the range protruded from the lower surface side of the base 2 is covered by a movable cover 25. The movable cover 25 is rotatably supported on the bearing box 17. The movable cover 25 is configured to move between a closed position in which the blade tip of the cutting blade 20 is entirely covered thereby within the range protruded from the lower surface side of the base 2 and a fully opened position in which the blade tip of the cutting blade 20 is entirely exposed within the range protruded from the lower surface side of the base 2.

Figure 2:
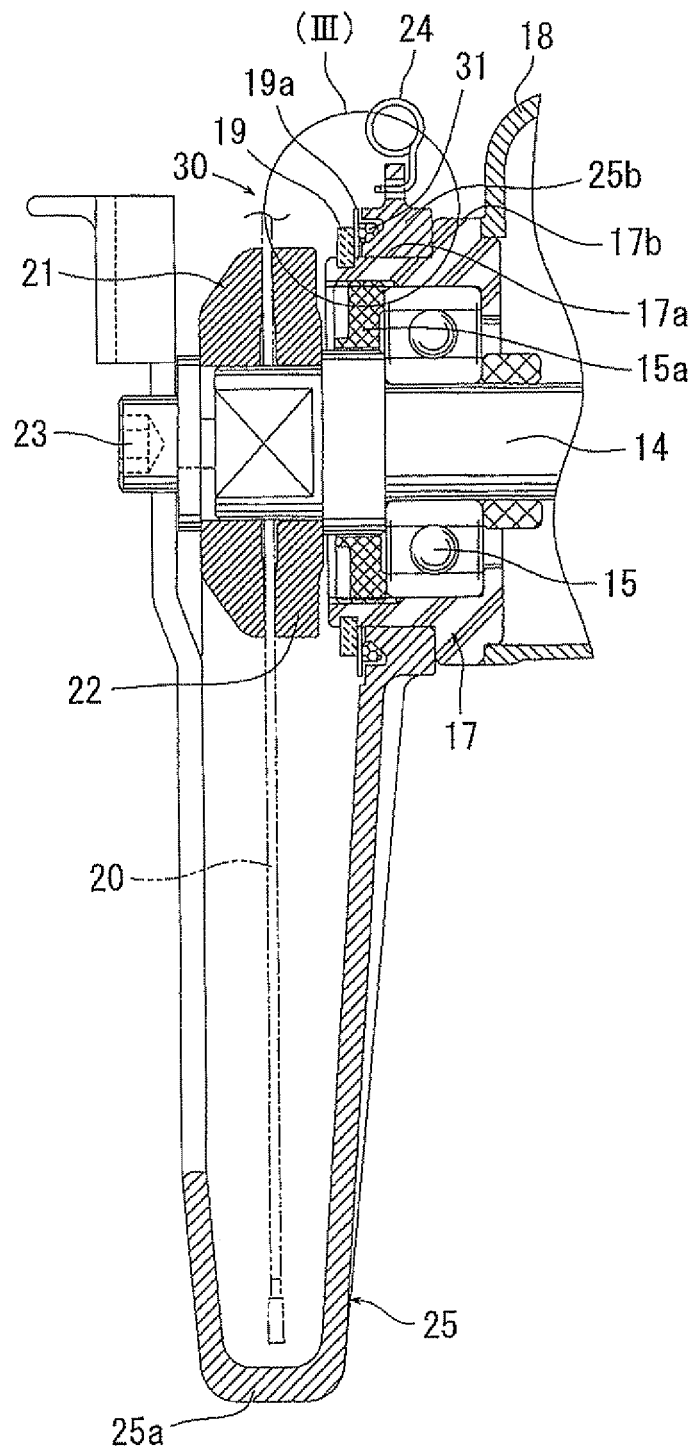
FIG. 2 is a vertical cross-sectional view around the movable cover and a bearing box having the dust-proof structure of the first embodiment.

The movable cover 25 and the bearing box 17 that supports the movable cover 25 are shown in FIG. 2 in detail. The movable cover 25 includes a cross-sectionally U-shaped cover portion 25a that covers the blade tip of the cutting blade 20, and a cylindrical supporting annular portion 25b that supports the cover portion 25a on the bearing box 17. A rotating boss portion 17a of the bearing box 17 is inserted into an inner circumferential side of the supporting annular portion 25b, so that the movable cover 25 can be rotatably supported to rotate coaxially with the spindle 14. An internal diameter of the supporting annular portion 25b with respect to an external diameter of the rotating boss portion 17a is appropriately set such that looseness cannot be formed therebetween within a range in which a smooth rotational action of the movable cover 25 is not impeded, and a clearance formed therebetween is set to be as small as possible.

A tension spring 24 is interposed between the supporting annular portion 25b and the bearing box 17. The movable cover 25 is biased in a closing direction by the tension spring 24. When the cutting machine 1 is moved in a cutting progressing direction while a front end portion of the movable cover 25 contacts a cutting end portion of the cutting object W, the movable cover 25 is relatively opened against the tension spring 24 and an exposed range of the cutting blade 20 is gradually expanded, so that the cutting blade can be cut into the cutting object W.

A shouldered axial restricting portion 17b is formed in an outer circumference of the bearing box 17, which portion is positioned in a rear face side of the rotating boss portion 17a. Additionally, a retaining ring 19 is attached to the outer circumference of the bearing box 17, which ring is positioned in a front face side of the rotating boss portion 17a. The supporting annular portion 25b is restricted from being axially displaced by the axial restricting portion 17b and the retaining ring 19. Accordingly, the retaining ring 19 may function as an axial restricting portion that restricts the supporting annular portion 25b from displacing toward a front face side thereof. A circular flat-plate-shaped washer 19a is interleaved between the supporting annular portion 25b and the retaining ring 19.

Thus, the supporting annular portion 25b is positioned between the retaining ring 19 as the axial restricting portion and the axial restricting portion 17b, so that axial displacement (backlash) thereof can be restricted. As a result, deflection (backlash) of the movable cover 25 in right-and-left directions (in directions of arrows X in FIG. 1) of the cutting advancing direction is restricted.

Figure 3:
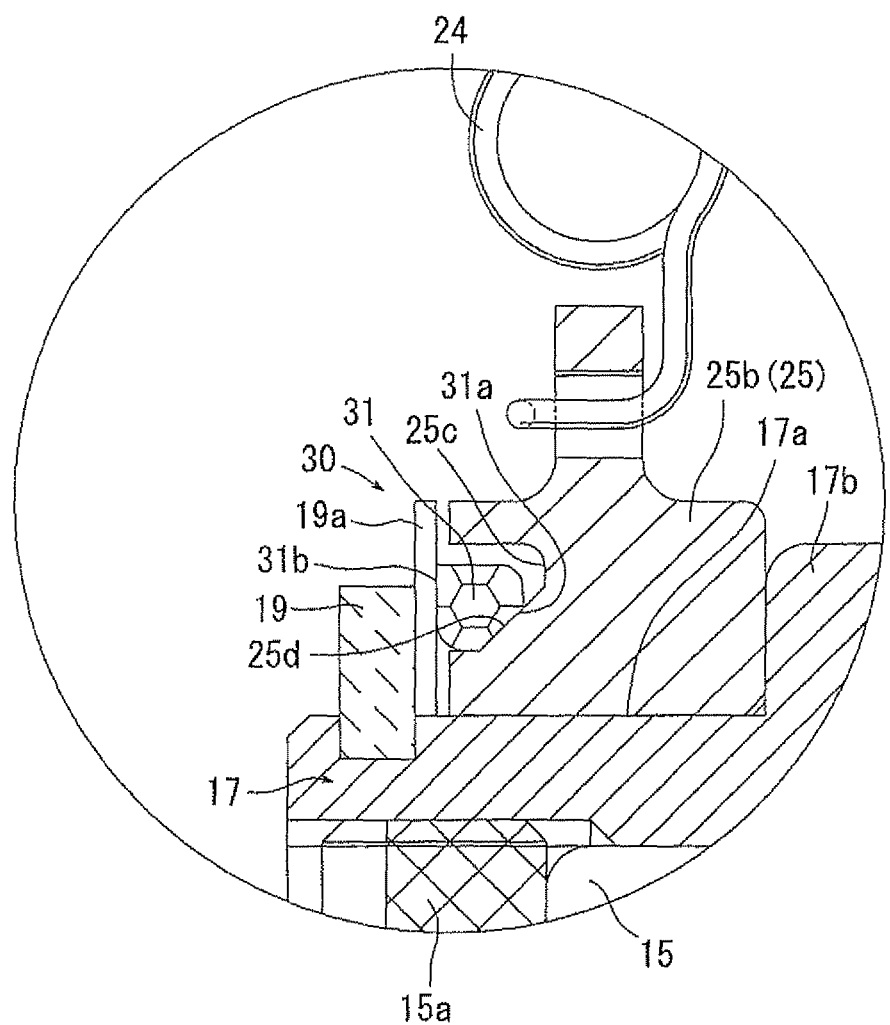
FIG. 3 is an enlarged view of a portion (III) of FIG. 2, which view is a vertical cross-sectional view of the dust-proof structure between a supporting annular portion of the movable cover and the bearing box.

A dust-proof structure is disposed between the supporting annular portion 25b and the bearing box 17 in order to prevent dust such as cutting powder from entering therein. Various embodiments of this dust-proof structure will be described below. A dust-proof structure 30 of a first embodiment includes a configuration in which a ring spring 31 is disposed between a front face-side end surface of the supporting annular portion 25b and the washer 19a. In the first embodiment, the ring spring 31 may be referred to as an elastic member. The ring spring 31 is molded by using a high-strength resin (for example, polyacetal) having high slidability and reduced coefficient of friction and has an annular shape (C-shape), so as to have a biasing force in a diameter reducing direction. The ring spring 31 is fitted in an annular recessed portion 25c that is formed in the front face-side end surface of the supporting annular portion 25b. As shown in FIG. 3, an inclined surface 25d is formed between a side wall portion positioned in a smaller-diameter side (a lower side in FIG. 3) of the recessed portion 25c and a bottom portion thereof. The inclined surface 25d is inclined in a direction that goes down toward a side wall portion positioned in an outer circumferential side (an upper side in FIG. 3).

Because the supporting annular portion 25b is disposed between the retaining ring 19 as the axial restricting portion and the axial restricting portion 17b so as to be restricted from being axially displaced, the ring spring 31 is attached while it is pushed into the recessed portion 25c. As a result, the ring spring 31 is attached in a condition in which it is pressed against the inclined surface 25d. Thus, the ring spring 31 is held within the recessed portion 25c in a condition in which it is displaced in a diameter increasing direction against the biasing force thereof. As a result, the ring spring 31 is pressed against the washer 19a (toward the retaining ring 19) by an axial component of the biasing force thereof to the inclined surface 25d.

The ring spring 31 has a pressing surface against the inclined surface 25d and a pressing surface against the washer 19a that are respectively formed as flat surfaces 31a and 31b over the entire circumference thereof. Therefore, the ring spring 31 is pressed against the inclined surface 25d and the washer 19a in a surface contact manner. Thus, the ring spring 31 is not simply circular in cross section and has the flat surfaces 31a and 31b that are formed over the entire circumference thereof, so as to be respectively pressed against the inclined surface 25d and the washer 19a in the surface contact manner. Therefore, the ring spring 31 can reliably transmit a pressing force while securing high slidability, so as to be smoothly deformed in the diameter increasing direction and the diameter reducing direction. Furthermore, the ring spring 31 may provide an axial elastic force to the supporting annular portion 25b, so as to prevent the backlash thereof and to ensure a dust-blocking function (a dust-proof function).

According to the dust-proof structure 30 of the first embodiment thus constructed, the ring spring 31 is elastically pressed against the recessed portion 25c of the supporting annular portion 25b and the washer 19a over the entire circumference thereof. Therefore, a dust entry path from a dust generation site (a side of the cutting blade 20) to the inner circumferential side of the supporting annular portion 25b is closed in an intermediate portion thereof, so that the dust can be prevented from entering the inner circumferential side of the supporting annular portion 25b. Thus, because dust-proofing of the inner circumferential side of the supporting annular portion 25b and surroundings thereof can be reliably made by the ring spring 31, it is possible to secure high dust-proofness even if an enough clearance is set in order to secure a smooth rotational operation of the supporting annular portion 25b and the movable cover 25 with respect to the bearing box 17. Thus, according to the dust-proof structure 30 of the first embodiment, a special bearing (a second bearing) used in the conventional art can be omitted. As a result, it is possible to secure the high dust-proofness without increasing costs of a supporting structure of the movable cover 25.

Further, the ring spring 31 having high slidability is pressed against the retaining ring 19 as the axial restricting portion via the washer 19a, thereby performing dust-proofing. Thus, when a standard retaining ring is used as the axial restricting portion, the ring spring 31 having a larger diameter can be pressed against the retaining ring via the washer that can be machined in an arbitrary size. Therefore, with regard to the size of the ring spring that can be used, a degree of freedom in selection can be increased.

Figure 4:
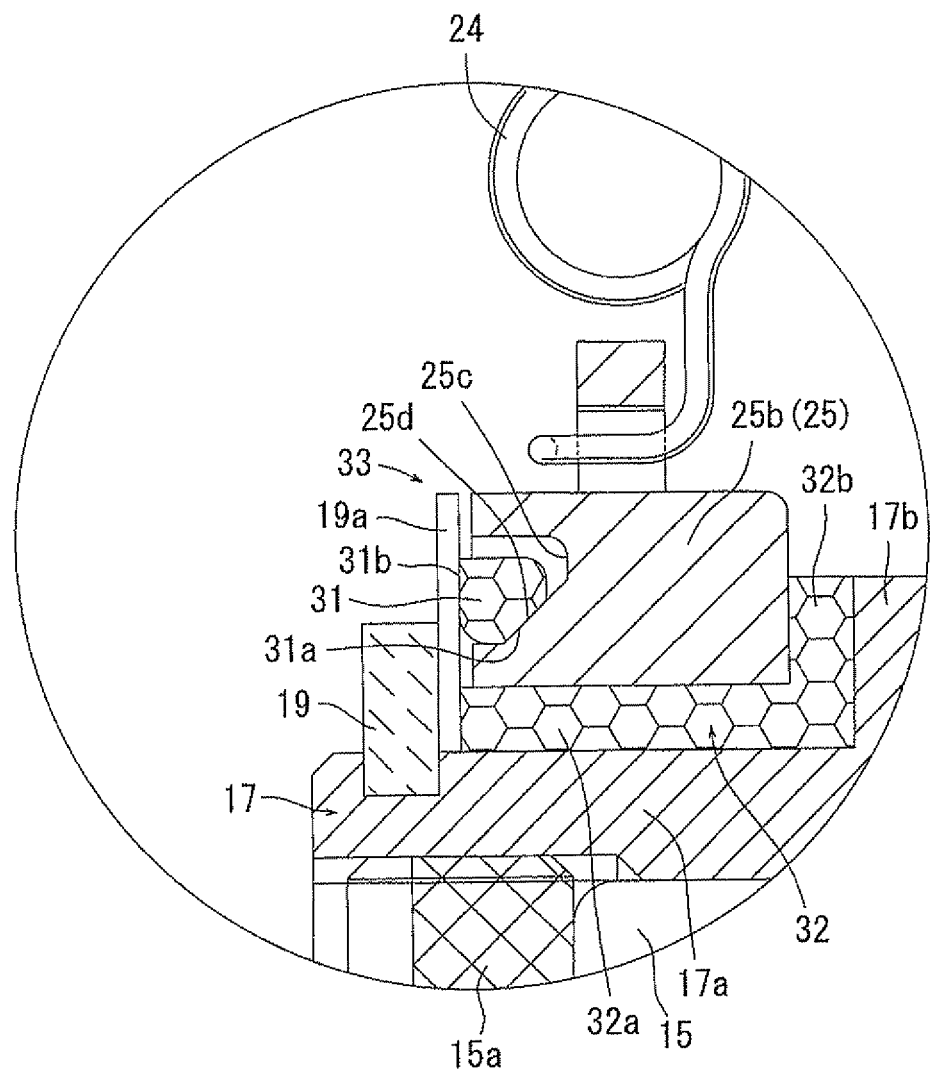
FIG. 4 is a vertical cross-sectional view of a dust-proof structure according to a second embodiment of the present invention.

Various changes can be made to the first embodiment described above. For example, as shown in FIG. 4, an intermediate sleeve 32 can be interposed between the supporting annular portion 25b of the movable cover 25 and the bearing box 17 (a second embodiment). Similar to the ring spring 31, the intermediate sleeve 32 can be molded by using a high-strength resin having high slidability (reduced frictional resistance), and can include a cylindrical body 32a that is sandwiched between an inner circumferential surface of the supporting annular portion 25b and the rotating boss portion 17a of the bearing box 17, and a flange portion 32b that projects from a rear face-side end portion of the cylindrical body 32a and is sandwiched between a rear face-side end portion of the supporting annular portion 25b and the axial restricting portion 17b of the bearing box 17. The intermediate sleeve 32 is secured to an outer circumferential side of the rotating boss portion 17a, so as to not be displaced in a rotational direction and an axial direction.

According to a dust-proof structure 33 of the second embodiment, the clearance between the supporting annular portion 25b of the movable cover 25 and the cylindrical body 32a of the intermediate sleeve 32 can be further reduced, so as to enhance the dust-proofness. Further, backlash between the supporting annular portion 25b and the cylindrical portion 32a can be eliminated, so that the movable cover 25 can be smoothly opened and closed.

Figure 5:
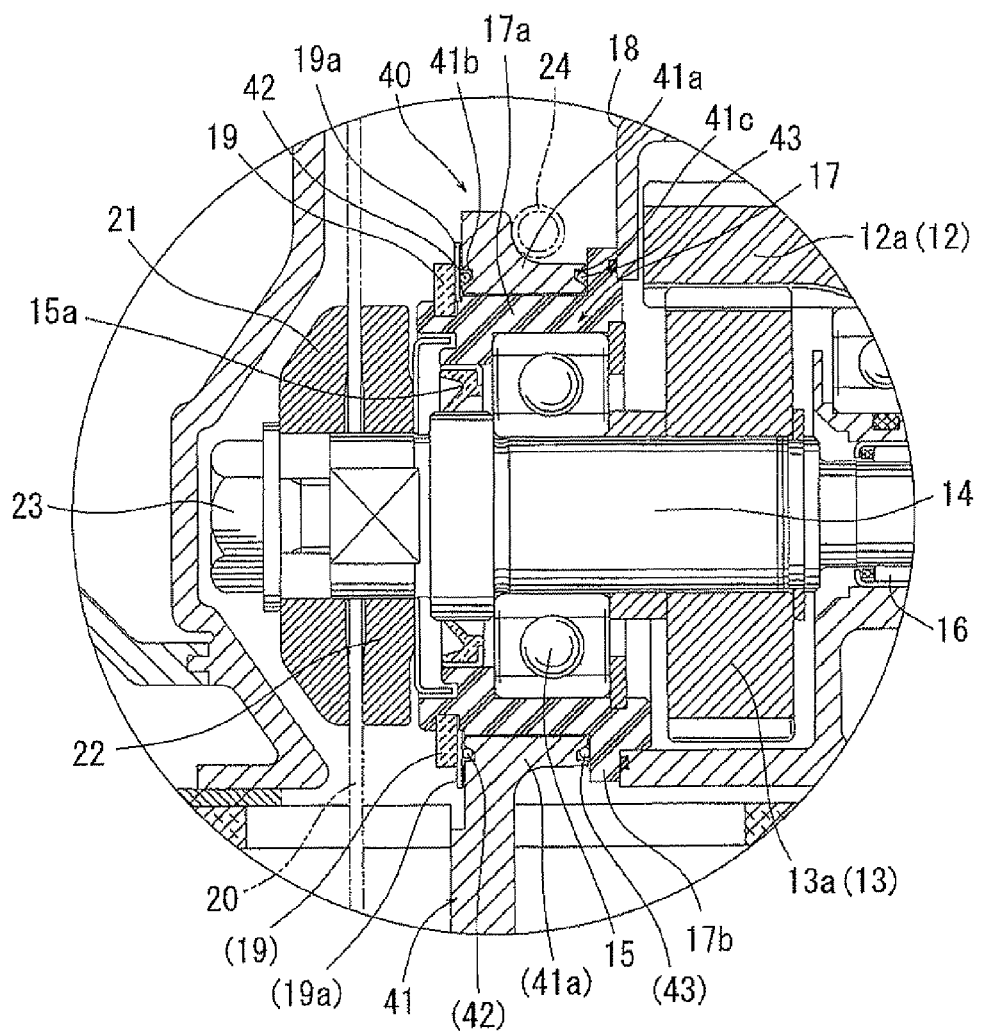
FIG. 5 is a vertical cross-sectional view of a dust-proof structure according to a third embodiment of the present invention.

A dust-proof structure 40 of a third embodiment in which a further change is added is shown in FIG. 5. In the dust-proof structure 40 of the third embodiment, two rubber rings 42 and 43 are used as the elastic member in place of the ring spring 31 in the first and second embodiments. Elements that are the same in the first and second embodiments will be identified by the same reference numerals and a detailed description of such elements may be omitted.

A front portion of the spindle 14 is rotatably supported by the bearing 15. The bearing 15 is held on the bearing case 17. A supporting annular portion 41a of a movable cover 41 is rotatably supported on the rotating boss portion 17a of the bearing case 17. Similar to the first and second embodiments, the supporting annular portion 41a has a cylindrical shape, and is restricted from being axially displaced by the axial restricting portion 17b of the bearing ease 17 and the retaining ring 19. Further, an internal diameter of the supporting annular portion 41a and an external diameter of the rotating boss portion 17a are set to such dimensions that allow the movable cover 41 to smoothly rotate within a range in which deflection (displacement in directions of arrow X in FIG. 1) is not generated therein.

Similar to the first and second embodiments, the washer 19a is interleaved between a front face-side end surface of the supporting annular portion 41a and the retaining ring 19. The rubber rings 42 and 43 each having an annular shape are respectively attached to both of the front face-side end surface and a rear face-side end surface of the supporting annular portion 41a. In the present embodiment, inexpensive members that are referred to as O-rings are used for the rubber rings 42 and 43. Thus, the rubber rings 42 and 43 can be reduced in cost as compared to the ring spring 31. Both of the rubber rings 42 and 43 are respectively fitted into recesses 41b and 41c that are formed in both of the end surfaces of the supporting annular portion 41a. Similar to the first and second embodiments, inclined surfaces are respectively formed in the recesses 41b and 41c, and the rubber rings 42 and 43 are respectively pressed against the inclined surfaces. Therefore, the front face-side rubber ring 42 is pressed against the inclined surface of the recessed portion 41b with an appropriate pressing force by the washer 19a, so as to be expanded in a diameter increasing direction. Conversely, the rear face-side rubber ring 43 is pressed against the inclined surface of the recessed portion 41c with an appropriate pressing force by the axial restricting portion 17b, so as to be expanded in a diameter increasing direction. As a result, the rubber rings 42 and 43 are respectively elastically pressed against the washer 19a and the axial restricting portion 17b with reaction forces caused by pressing.

In the third embodiment, a dust entry path from a side of the cutting blade 20 (a dust generation site) to an inner circumferential side of the supporting annular portion 41a is closed in an intermediate portion thereof and in both of a front face side and a rear face side by the two rubber rings 42 and 43 thus attached.

According to the dust-proof structure 40 of the third embodiment thus constructed, the dust can be prevented from entering the inner circumferential side of the supporting annular portion 41a and surroundings thereof by the two rubber rings 42 and 43. Therefore, it is possible to secure high dust-proofness even if an enough clearance is set between the supporting annular portion 41a and the supporting boss portion 17a of the bearing case 17 in order to secure a smooth opening and closing operation of the movable cover 41. Thus, a bearing conventionally used to rotationally support a movable cover can be omitted. As a result, it is possible to reduce costs of a supporting structure.

Figure 6:
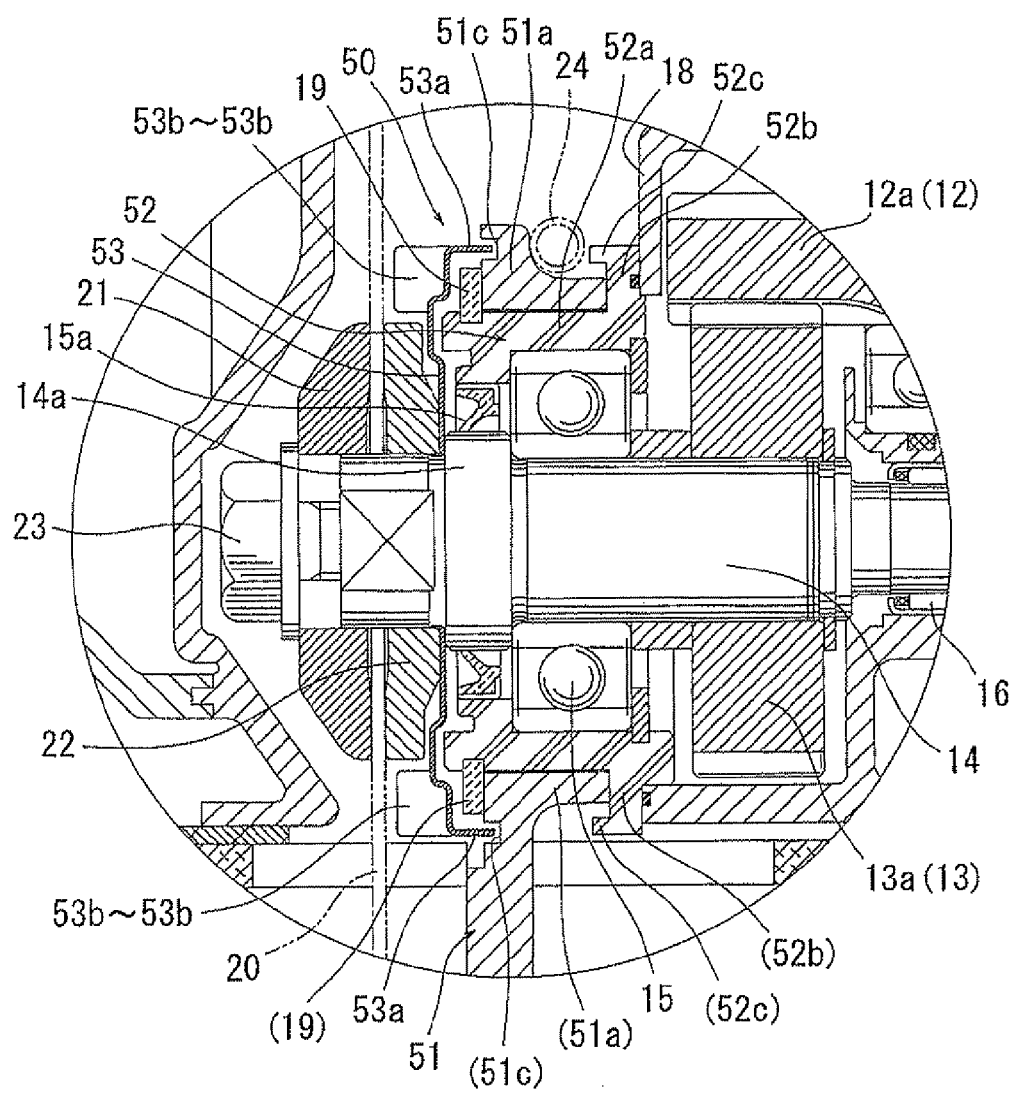
FIG. 6 is a vertical cross-sectional view of a dust-proof structure of a fourth embodiment according to a related invention.

A dust-proof structure 50 according to a fourth embodiment is shown in FIG. 6. The fourth embodiment is a dust-proof structure that is mainly based on a labyrinth structure unlike an elastic member sealing structure in the first to third embodiments, which corresponds to an embodiment of a related invention. Elements that are the same in the first to third embodiments will be identified by the same reference numerals and a detailed description of such elements may be omitted.

Similar to the embodiments previously described, a supporting annular portion 51a of a movable cover 51 is rotatably supported on a rotating boss portion 52a of a bearing box 52. The movable cover 51 is biased in a closing direction by the tension spring 24 that is disposed between the supporting annular portion 51a and the bearing box 52.

The supporting annular portion 51a is restricted from being displaced toward a front face side by the retaining ring 19 attached to the bearing box 52, and is restricted from being displaced toward a rear face side by an axial restricting portion 52b that is attached to a rear face-side end portion of the bearing box 52.

A recessed portion 51c is formed in a front face-side end surface of the supporting annular portion 51a over the entire circumference thereof. A circumferential peripheral edge portion of a dust-proof washer 53 enters the recessed portion 51c. The dust-proof washer 53 is held between a flange portion 14a of the spindle 14 and the inner side fixture flange 22, so as to rotate integrally with the spindle 14. The circumferential peripheral edge portion of the dust-proof washer 53 is bent at a right angle toward the rear face side, so as to form a bent portion 53a that is introduced into the recessed portion 51c without contacting the same. As the bent portion 53a of the dust-proof washer 53 enters the recessed portion 51e, a dust entry path from a side of the cutting blade 20 to an inner circumferential side of the supporting annular portion 51a is bent in an intermediate portion thereof, so that the labyrinth structure (a path bending structure) can be formed. Thus, dust-proofing in a clearance between the front face-side end surface of the supporting annular portion 51a and the retaining ring 19 and in the inner circumferential side of the supporting annular portion 51a can be performed.

A dust-proof rim 52c is formed in an axial restricting portion 52b of a bearing box 52 over the entire circumference thereof while it is projected toward the front face side. As shown therein, the dust-proof rim 52c is projected so as to cover an outer circumferential side of a rear face-side end portion of the supporting annular portion 51a. Thus, the clearance between the rear face-side end portion of the supporting annular portion 51a and the axial restricting portion 52b is shielded by the dust-proof rim 52c from the side of the cutting blade 20 (the dust generation site), so that dust-proofing in a clearance between the rear face-side end portion of the supporting annular portion 51a and the axial restricting portion 52b and in the inner circumferential side of the supporting annular portion 51a can be performed.

A plurality of fins 53b to 53b are provided to a front face-side circumferential periphery of the dust-proof washer 53 so as to project toward the front face side. The fins 53b to 53b are positioned at regular intervals in a circumferential direction, and are projected so as to not interfere with the fixture flange 22. Due to the fins 53b to 53b, the dust-proof washer 53, when rotates integrally with the spindle 14, can function as a dust-proof fan.

Thus, according to the dust-proof structure 50 of the fourth embodiment, a front face side of the supporting annular portion 51a of the movable cover 51 is shielded from the side of the cutting blade 20 by the bent portion 53a of the dust-proof washer 53, and a rear face side thereof is shielded from the side of the cutting blade 20 by the dust-proof rim 52c of the gear box 52. Thus, the dust can be prevented from entering the clearance between the front face-side end portion of the supporting annular portion 51a and the retaining ring 19 and the clearance between the rear face-side end portion of the supporting annular portion 51a and the axial restricting portion 52b. As a result, the dust can be prevented from entering the inner circumferential side of the supporting annular portion 51a. Therefore, in order to secure a smooth opening and closing operation of the movable cover 51, an enough clearance can be set between the supporting annular portion 51a and the rotating boss portion 52a of the bearing box 52. Thus, it is possible to secure the high dust-proofness without using a special bearing (a second bearing) used in the conventional art. As a result, cost reduction can be achieved.

Additionally, according to the dust-proof structure 50 of the fourth embodiment, the dust-proof washer 53 that rotates integrally with the spindle 14 can function as the dust-proof fan. Therefore, the dust generated in the side of the cutting blade 20 can be prevented from being easily blown toward the supporting annular portion 51a. As a result, a rotatably supporting portion in which the supporting annular portion 51a is supported on the bearing box 52 can have increased dust-proofness.

Moreover, according to the dust-proof structure 50 of the fourth embodiment, both of the bent portion 53a of the dust-proof washer 53 and the dust-proof rim 52c of the bearing box 52 do not contact the supporting annular portion 51a. Thus, a rotational operation of the supporting annular portion 51a with respect to the bearing box 52 cannot be obstructed, so that an opening and closing operation of the movable cover 51 can be smoothly performed.

Figure 7:
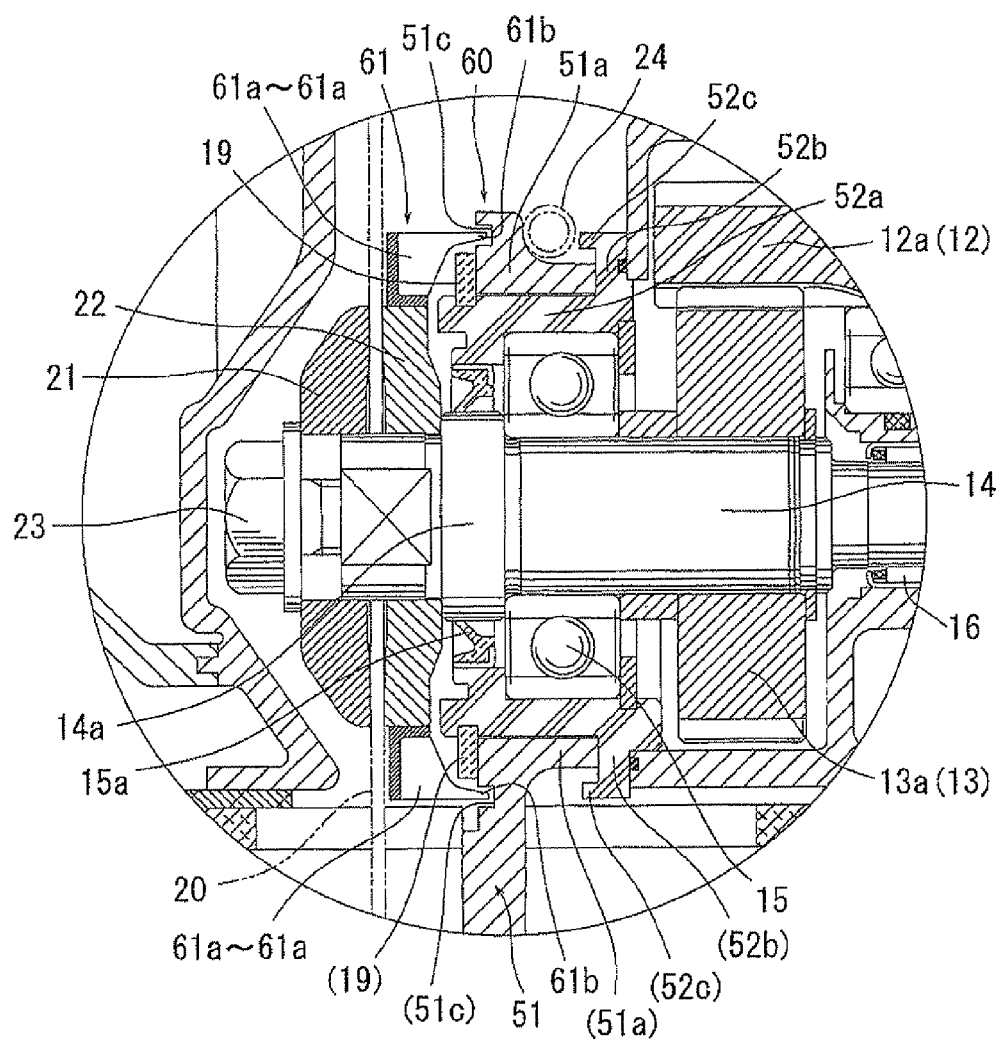
FIG. 7 is a vertical cross-sectional view of a dust-proof structure of a fifth embodiment according to the related invention.

A dust-proof structure 60 according to a fifth embodiment that is modified from the fourth embodiment is shown in FIG. 7. The dust-proof structure 60 of the fifth embodiment is different from the fourth embodiment in that a dust-proof fan 61 is used instead of the dust-proof washer 53 of the fourth embodiment. Elements that are the same in the fourth embodiment will be identified by the same reference numerals and a detailed description of such elements may be omitted.

In the fifth embodiment, the dust-proof fan 61 is circumferentially integrally attached to the inner side fixture flange 22. Therefore, the dust-proof fan 61 can rotate integrally with the spindle 14. A plurality of fins 61a to 61a are circumferentially provided to the dust-proof fan 61. As will be illustrated, each of the fins 61a is shaped to be elongated toward the rear face side as it is closer to an outer periphery thereof. A rear face-side protruding portion 61b of each of the fins 61a enters the recessed portion 51c formed in the front face-side end portion of the supporting annular portion 51a without interfering therewith.

According to the dust-proof structure 60 of the fifth embodiment thus constructed, the dust-proof fan 61 can rotate integrally with the spindle 14. Therefore, the rear face-side protruding portion 61b of each of the fins 61a of the dust-proof fan 61 moves at high speed along an interior surface of the recessed portion 51c. As a result, an outer circumferential side (the side of the cutting blade 20) of the clearance between the front face-side end surface of the supporting annular portion 51a and the retaining ring 19 can substantially be shielded by the fins 61a to 61a of the dust-proof fan 61. Thus, the clearance between the front face-side end surface of the supporting annular portion 51a and the retaining ring 19 that restricts the supporting annular portion 51a from displacing toward the front face side can be shielded from the side of the cutting blade 20 by the rear face-side protruding portion 61b of each of the fins 61a rotating at high speed. In addition, similar to the fourth embodiment, the clearance between the rear face-side end surface of the supporting annular portion 51a and the axial restricting portions 52b that restricts the supporting annular portion 51a from displacing toward the rear face side can be shielded from the side of the rotary knife 20 by the dust-proof rim 52c. As a result, the dust can be prevented from entering the inner circumferential side of the supporting annular portion 51a. Thus, according to the dust-proof structure 60 of the fifth embodiment, the rotatably supporting portion in which the supporting annular portion 51a is supported on the bearing box 52 can have increased dust-proofness. Further, the second bearing used in the conventional art can be omitted, so as to achieve cost reduction.

Additionally, according to the fifth embodiment, the dust generated in the side of the cutting blade 20 can be blown away by the dust-proof fan 61. Thus, the high dust-proofness near the supporting annular portion 51a can be secured in this respect.

Figure 8:
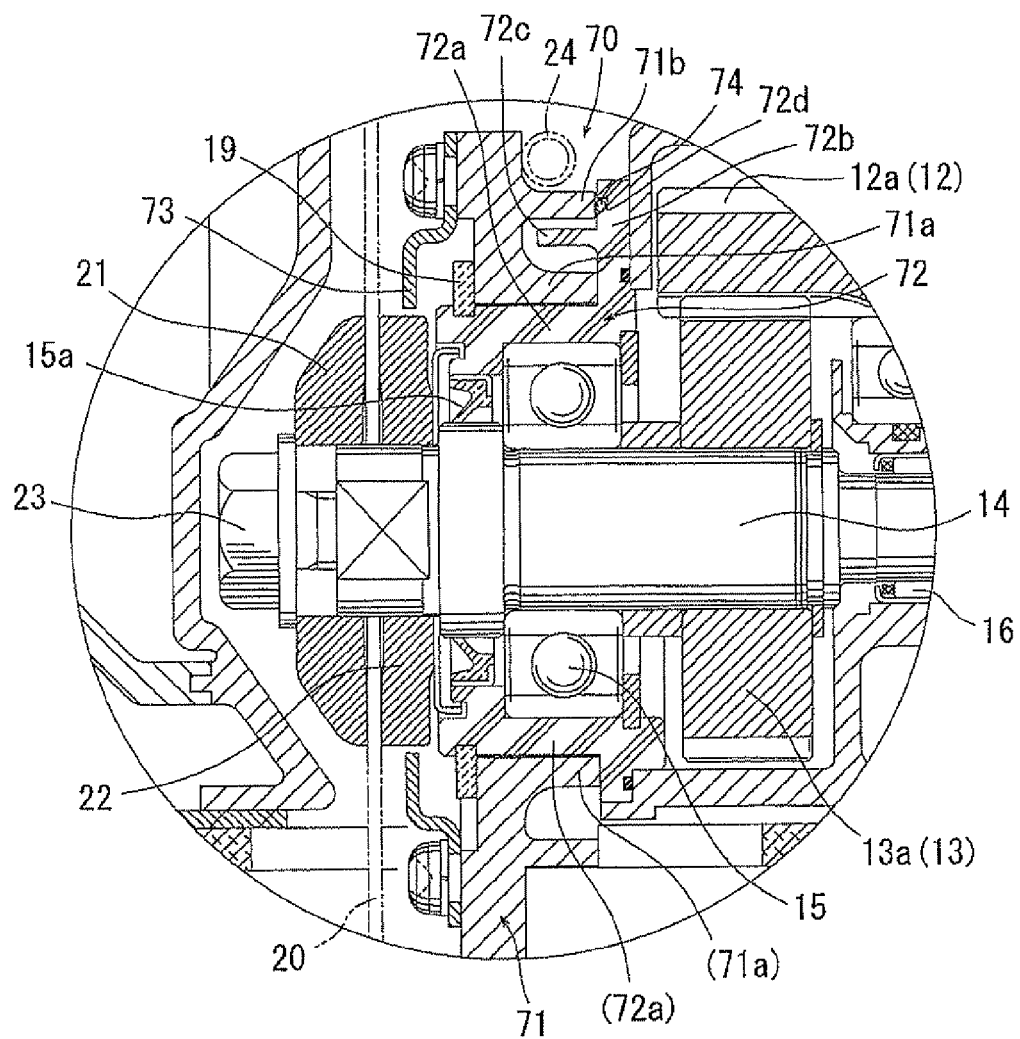
FIG. 8 is a vertical cross-sectional view of a dust-proof structure of a sixth embodiment related to the related invention.

A dust-proof structure 70 of a sixth embodiment is shown in FIG. 8. The sixth embodiment is constructed to have both of the elastic member sealing structure and the labyrinth structure, so that dust-proof performance can be further increased. Elements that are the same in the embodiments described above will be identified by the same reference numerals and a detailed description of such elements may be omitted. The dust-proof structure 70 of the sixth embodiment has features in the structure of a supporting annular portion 71a of a movable cover 71 and a bearing box 72. The supporting annular portion 71a of the movable cover 71 is rotatably supported on a rotating boss portion 72a of the bearing box 72. The supporting annular portion 71a is restricted from being displaced toward a front face side thereof by the retaining ring 19. The supporting annular portion 71a is restricted from being displaced toward a rear face side thereof by an axial restricting portion 72b that is attached to the bearing box 72.

A ring-shaped dust-proof cover 73 is attached to the front face side of the supporting annular portion 71a. A clearance between the retaining ring 19 and a front face-side end surface of the supporting annular portion 71a is shielded from the side of the cutting blade 20 (the dust generation site) by the dust-proof cover 73.

Integrally provided to the supporting annular portion 71a is a second dust-proof wall portion 71b that projects toward the rear face side thereof. The second dust-proof wall portion 71b is cylindrically formed along an outer circumferential side of the supporting annular portion 71a. Also, integrally provided to the axial restricting portion 72b of the bearing box 72 is a cylindrical first dust-proof wall portion 72c that projects toward a front face side thereof. The first dust-proof wall portion 72c formed in the bearing box 72 enters an inner circumferential side of the second dust-proof wall portion 71b formed in the supporting annular portion 71a.

A recessed portion 72d similar to the recessed portion 25c of the first embodiment is formed in the front face side of the axial restricting portion 72b of the bearing box 72. The recessed portion 72d is positioned in an outer circumferential side of the first dust-proof wall portion 72c. Similar to the first embodiment, an annular ring spring 74 is fitted into the recessed portion 72d. An inclined surface is formed in an inner circumferential side of the recessed portion 72d so as to be positioned between a side wall portion and a bottom portion thereof. The ring spring 74 is pressed against the inclined surface. The ring spring 74 is pressed against the inclined surface formed in the recessed portion 72d by the second dust-proof wall portion 71b formed in the supporting annular portion 71a, so as to be displaced in a diameter increasing direction against a biasing force thereof. As a result, the ring spring 74 can be pressed against a distal end surface of the second dust-proof wall portion 71b by an axial component of a reaction force of the biasing force.

The tension spring 24 for biasing the movable cover 71 toward a closing direction is interposed between the supporting annular portion 71a and the bearing box 72. In the sixth embodiment, the tension spring 24 is positioned along an outer circumferential surface of the second dust-proof wall portion 71b formed in the supporting annular portion 71a.

According to the dust-proof structure 70 of the sixth embodiment thus constructed, the clearance between the front face-side end surface of the supporting annular portion 71a and the retaining ring 19 can be shielded from the side of the cutting blade 20 (the dust generation site) by the dust-proof washer 73, so that dust-proofing therein can be performed. Further, a clearance between the rear face side of the supporting annular portion 71a and the axial restricting portions 72b can be shielded from the side of the cutting blade 20 by the second dust-proof wall portion 71b and the first dust-proof wall portion 72c, so that dust-proofing therein can be performed. Therefore, even if an enough clearance is set between the supporting annular portion 71a and the rotating boss portion 72a of the bearing box 72 in order to secure a smooth opening and closing operation of the movable cover 71, high dust-proofness can be secured therebetween. Thus, the special second bearing used in the conventional art can be omitted, so as to achieve cost reduction.

Additionally, since a clearance between the second dust-proof wall portion 71b of the supporting annular portion 71a and the axial restricting portion 72b of the bearing box 72 is sealed by the ring spring 74, higher dust-proofness can be realized. Moreover, since a more complicated bent path (a labyrinth structure) is formed in an intermediate portion of a dust entry path from the side of the cutting blade 20 to an inner circumferential side of the supporting annular portion 71a by the second dust-proof wall portion 71b of the supporting annular portion 71a and the dust-proof wall portion 72 of the bearing box 72, the dust can be reliably prevented from entering the inner circumferential side of the supporting annular portion 71a in this respect.

Various changes can be added to the embodiments described above. For example, in the first embodiment, the inclined surface 25d is formed within the recessed portion 25c such that the ring spring 31 can be displaced in the diameter increasing direction. However, instead of this or in addition to this, an inclined surface can be formed in the retaining ring 19 or the washer 19a such that the ring spring 31 as the elastic member can be reliably displaced in the diameter increasing direction.

Further, in the first embodiment, the ring spring 31 is interposed between the front-side end surface (the recessed portion 25c) of the supporting annular portion 25b and the retaining ring 19 as the front-side axial restricting portion. However, instead of this or in addition to this, the ring spring 31 can be interposed between the back-side end surface of the supporting annular portion 25b and the back-side axial restricting portion 17b. Such a structure is shown in FIGS. 9 and 10.

Figure 9:
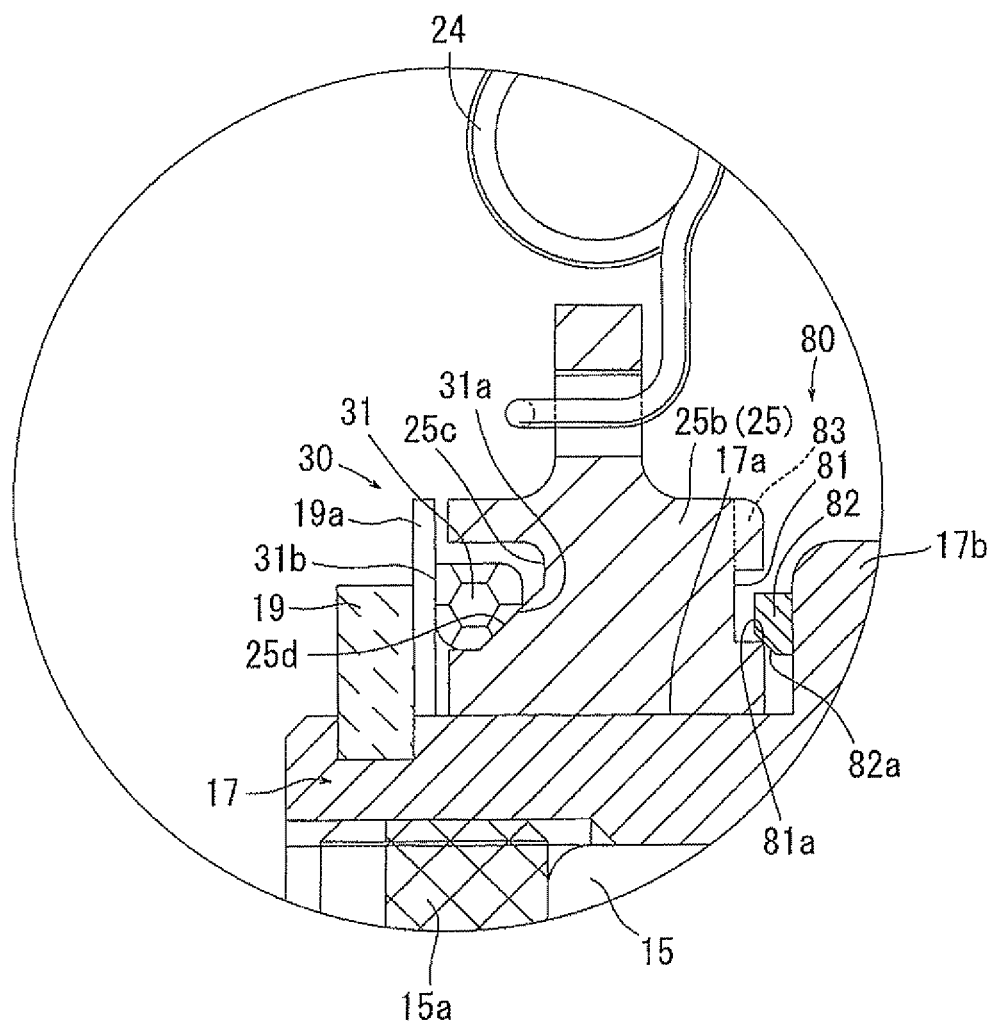
FIG. 9 is a vertical cross-sectional view of the dust-proof structure between a supporting annular portion of a movable cover and a bearing box, which view shows another embodiment of an inclined surface for displacing an elastic member in a diameter-increasing direction. This drawing shows an embodiment in which the inclined surface is disposed in the elastic member itself and not a recessed portion.

In a dust-proof structure 80 shown in FIG. 9, a recessed portion 81 is formed in a back surface of the supporting annular portion 25b, and a mouth corner portion 81a of the recessed portion 81 is pressed against a flat surface 82a of an elastic member 82. A front side of the supporting annular portion 25b is provided with the dust-proof structure 30 of the first embodiment. According to the dust-proof structure 80, the flat surface 82a (an inclined surface) of the elastic member 82 can be pressed between the supporting annular portion 25b and the axial restricting portion 17b, so that the elastic member 82 can be displaced in the diameter increasing direction. Thus, along with the front-side dust-proof structure 30, the dust entry path into the inner circumferential side of the supporting annular portion 25b can be reliably closed while the smooth opening and closing operation of the movable cover 25 can be secured. In this case, the flat surface 82a of the elastic member 82 may function as an inclined surface that displaces the elastic member 82 in the diameter increasing direction.

Further, the recessed portion 81 can be formed as a shouldered portion by removing an outer circumferential-side wall portion 83 (a portion to the right of a broken line in FIG. 9) thereof. Additionally, an annular wall portion that projects rearward (toward the elastic member) can be provided to the back surface of the supporting annular portion 25b in place of the recessed portion, so that a corner portion of the wall portion can be pressed against the inclined surface of the elastic member.

Figure 10:
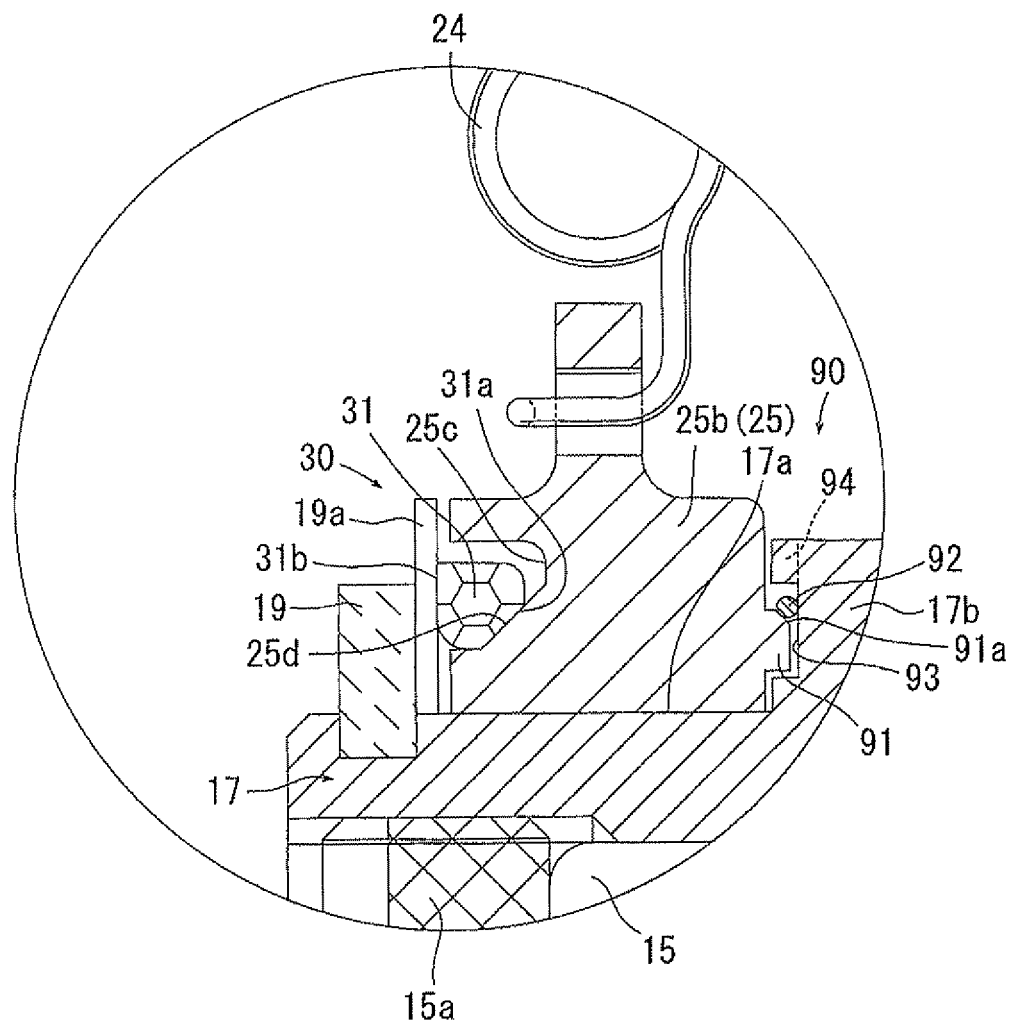
FIG. 10 is a vertical cross-sectional view of the dust-proof structure between a supporting annular portion of a movable cover and a bearing box, which view shows a further embodiment of the inclined surface for displacing the elastic member in the diameter-increasing direction. This drawing shows an embodiment in which the inclined surface is disposed in a portion other than the elastic member itself and the recessed portion.

In a dust-proof structure 90 shown in FIG. 10, an annular wall portion 91 that projects rearward is formed in the back surface of the supporting annular portion 25b, and the wall portion 91 includes an inclined surface 91a that is capable of displacing an elastic member 92 in the diameter increasing direction. The elastic member 92 is received within a recessed portion 93 that is formed in the axial restricting portion 17b. Even by the dust-proof structure 90, the elastic member 92 can be pressed between the inclined surface 91a of the supporting annular portion 25b and the recessed portion 93 of the axial restricting portion 17b, so as to be displaced in the diameter increasing direction. Thus, along with the front-side dust-proof structure 30, the dust entry path into the inner circumferential side of the supporting annular portion 25b can be closed while the smooth opening and closing operation of the movable cover 25 can be secured. Further, in this case, the recessed portion 93 can be formed as a shouldered portion by removing an outer circumferential-side wall portion 94 (a portion to the left of a broken line in FIG. 10) thereof.

Moreover, in the first embodiment, the ring spring 31 has the flat surface 31a as the pressing surface against the inclined surface 25d, so as to be pressed against the inclined surface 25d in the surface contact manner. Further, the ring spring 31 has the flat surface 31b as the pressing surface against the retaining ring 19 (the washer 19a), so as to be pressed against the retaining ring 19 in the surface contact manner. However, the flat surfaces 31a and 31b may be omitted.

Further, the handheld cutting machine that is moved on the cutting object W by a user is exemplified as the cutting machine. However, the exemplified dust-proof structures can be applied to a tabletop type cutting machine in which a cutting blade is cut into the cutting object secured on a table by lowering a cutting machine main body with respect to the cutting object.

The invention claimed is:

1. A dust-proof structure of a rotatably supporting portion of a movable cover with respect to a main body case in a cutting machine that includes a base that is placed on an upper surface of a cutting object, a cutting machine main body that is supported on an upper surface side of the base, the cutting machine main body having the main body case and a circular cutting blade that is rotated by an electric motor, an upper portion of the cutting blade being covered by the main body case, a lower portion of the cutting blade being protruded from a lower surface side of the base, and a blade tip of a protruded portion thereof being openably and closably covered by the movable cover,
   wherein the cutting blade is attached to a spindle that is rotatably supported by a bearing disposed in a bearing box of the main body case,
   wherein the movable cover includes a cylindrical supporting annular portion and is rotationally supported by rotatably supporting the supporting annular portion on an outer circumferential side of the bearing box, so as to be capable of opening and closing the blade tip,
   wherein the supporting annular portion of the movable cover is restricted from being displaced axially displaced by an axial restricting portion attached to the bearing box portion,
   wherein an annular elastic member is interposed between an axial end surface of the supporting annular portion and the axial restricting portion while it is pressed, so that a dust entry path from a side of the cutting blade to an inner circumferential side of the supporting annular portion can be closed, and
   wherein the elastic member is under a biasing force in a diameter reducing direction and it is displaced in a diameter increasing direction in response to the biasing force, wherein a recessed portion for receiving at least a portion of the elastic member is formed in the axial end surface of the supporting annular portion, and wherein the recessed portion has an inclined surface that is inclined in a direction to displace the elastic member in the diameter increasing direction so that the elastic member displaces against the axial restricting portion.

2. The dust-proof structure as defined in claim 1, wherein the elastic member is made of resin.

3. The dust-proof structure as defined in claim 1, wherein a pressing surface of the elastic member against the inclined surface is formed as a flat surface.

4. The dust-proof structure as defined in claim 1, wherein the axial restricting portion comprises a washer and a retainer ring, and wherein the washer is interposed between the elastic member and the retainer ring.

5. The dust-proof structure as defined in claim 1, wherein a pressing surface of the elastic member against the axial restricting portion is formed as a flat surface.

* * * * *